United States Patent
Fuqua

(12) 
(10) Patent No.: US 9,849,770 B2
(45) Date of Patent: Dec. 26, 2017

(54) PLACEMENT OF AN OPPOSED-PISTON ENGINE IN A HEAVY-DUTY TRUCK

(71) Applicant: Achates Power, Inc., San Diego, CA (US)

(72) Inventor: Kevin B. Fuqua, San Diego, CA (US)

(73) Assignee: ACHATES POWER, INC., San Diego, CA (US)

(*) Notice: Subject to any disclaimer, the term of this patent is extended or adjusted under 35 U.S.C. 154(b) by 224 days.

(21) Appl. No.: 13/891,466

(22) Filed: May 10, 2013

(65) Prior Publication Data
US 2014/0332306 A1  Nov. 13, 2014

(51) Int. Cl.
  *B60K 5/02* (2006.01)
  *F01B 7/14* (2006.01)
  *F02B 75/28* (2006.01)
  *F02B 75/02* (2006.01)

(52) U.S. Cl.
  CPC .......... *B60K 5/02* (2013.01); *F01B 7/14* (2013.01); *F02B 75/282* (2013.01); *B60Y 2200/14* (2013.01); *B60Y 2200/142* (2013.01); *F02B 2075/025* (2013.01)

(58) Field of Classification Search
  CPC . B60K 5/02; F02B 75/20; F02B 75/28; F02B 75/24; F02B 75/225; F02B 75/32; F01B 7/14; F02F 1/186
  USPC ........ 123/59.6, 52.3, 52.4, 52.6; 180/55, 58, 180/291, 374, 299, 292
  See application file for complete search history.

(56) References Cited

U.S. PATENT DOCUMENTS

| | | | | |
|---|---|---|---|---|
| 1,077,956 A | * | 11/1913 | Fox ........................ | 123/51 AA |
| 1,406,319 A | * | 2/1922 | Wygodsky .................. | 60/629 |
| 1,813,276 A | * | 7/1931 | Burtnett ..................... | 123/52.6 |
| 2,054,232 A | * | 9/1936 | Schneider et al. ........ | 123/51 BA |
| 2,129,107 A | * | 9/1938 | Taylor ....................... | 474/110 |
| 2,187,410 A | * | 1/1940 | Avila ....................... | B60K 5/00 180/54.1 |
| 2,311,254 A | * | 2/1943 | Raybon .................... | 123/51 AA |

(Continued)

FOREIGN PATENT DOCUMENTS

| | | |
|---|---|---|
| CA | 493508 A | 6/1953 |
| DE | 889850 C | 9/1954 |

(Continued)

OTHER PUBLICATIONS

Jumo, Jul. 20, 2011, http://web.archive.org/web/20110720215940/http://inter.action.free.fr/images/affiches/junkers-jumo.gif.*

(Continued)

*Primary Examiner* — Bryan A Evans
(74) *Attorney, Agent, or Firm* — Terrance A. Meador

(57) ABSTRACT

An engine placement configuration for a heavy-duty truck includes a chassis having two spaced-apart frame rails running in a longitudinal direction of the chassis, between front and rear ends, and a front wheel assembly with an axle attached to the frame rails. An opposed-piston engine is supported on the frame rails and positioned between the front end and the axle. The opposed-piston engine includes a cylinder assembly with a longitudinal axis disposed between the frame rails and oriented vertically with respect to the longitudinal direction. Alternatively, the opposed-piston engine includes a row of cylinders disposed between the rails and running in the longitudinal direction.

20 Claims, 9 Drawing Sheets

(56) References Cited

U.S. PATENT DOCUMENTS

| | | | | |
|---|---|---|---|---|
| 2,347,444 | A | * | 4/1944 | Conrad .................. 123/51 BA |
| 2,507,923 | A | * | 5/1950 | Morris .................. 123/51 BA |
| 2,507,946 | A | * | 5/1950 | Erwin ....................... 60/607 |
| 2,591,219 | A | | 4/1952 | Vincent |
| 2,644,541 | A | * | 7/1953 | Bachle .................. 180/68.1 |
| 2,768,616 | A | | 10/1956 | Venediger |
| 2,805,654 | A | * | 9/1957 | Jacklin .................. 123/51 BA |
| 2,949,899 | A | * | 8/1960 | Jacklin .................. 123/627 |
| 4,114,714 | A | | 9/1978 | Fachbach et al. |
| 4,185,596 | A | * | 1/1980 | Noguchi et al. .......... 123/51 B |
| 4,287,859 | A | * | 9/1981 | Noguchi et al. ......... 123/51 BA |
| 4,638,637 | A | * | 1/1987 | Kronogard et al. .......... 60/718 |
| 4,736,727 | A | | 4/1988 | Williams ................. 123/563 |
| 4,773,358 | A | * | 9/1988 | Heath ................... 123/51 AA |
| 5,029,559 | A | * | 7/1991 | Lively, Sr. ............... F01B 7/14 123/47 A |
| 5,285,863 | A | | 2/1994 | Miki ...................... 180/68.2 |
| 6,782,965 | B2 | | 8/2004 | Sztykiel et al. ............ 180/202 |
| 6,840,570 | B2 | | 1/2005 | Bock et al. .............. 296/193.07 |
| 7,156,056 | B2 | * | 1/2007 | Lemke et al. ............. 123/41.35 |
| 7,278,680 | B2 | | 10/2007 | Burnham ................ 296/193.09 |
| 7,611,185 | B2 | | 11/2009 | Allen ..................... 296/37.6 |
| 8,424,913 | B1 | | 4/2013 | Schunke et al. ............ 280/800 |
| 2005/0274332 | A1 | | 12/2005 | Lemke et al. ............. 123/41.35 |
| 2012/0210985 | A1 | | 8/2012 | Fuqua et al. |
| 2012/0285422 | A1 | * | 11/2012 | Exner et al. ................ 123/51 R |

FOREIGN PATENT DOCUMENTS

| | | |
|---|---|---|
| WO | WO 2007/010186 A1 | 1/2007 |
| WO | WO-2012/142530 | 10/2012 |
| WO | WO-2014/182895 A2 | 11/2014 |

OTHER PUBLICATIONS

Pirault, J.P. and Flint, M. *Opposed Piston Engines: Evolution, Use, and Future Applications*, 2010, pp. 142-149.

Junkers Flugmotor JUMO 250D Baureihe 1 u. 2, Junkers Flugzeug-Und-Motorwerke Aktiengesellschaft Motorenbau Stammwerk Dessau, März, 1941; pp. 10-14.

International Search Report and Written Opinion for PCT application No. PCT/US2014/037294, dated May 8, 2014.

"V engine," Wikipedia, https://en.wikipedia.org/wiki/V_engine, Jul. 23, 2015, 3 pages.

Notification of First Office Action, dated May 4, 2017, by the State Intellectual Property Office of PRC, for corresponding Chinese patent application No. 20148002546.1.

\* cited by examiner

PLACEMENT OF AN OPPOSED-PISTON ENGINE IN A HEAVY-DUTY TRUCK

BACKGROUND

The field relates to a vehicle equipped with a two-stroke cycle, opposed-piston engine. Specifically the field includes placement of a vertically-disposed, multi-cylinder opposed-piston engine in a vehicle structure, particularly that of a heavy-duty truck.

A two-stroke cycle engine is an internal combustion engine that completes a power cycle with a single complete rotation of a crankshaft and two strokes of a piston connected to the crankshaft. One example of a two-stroke cycle engine is an opposed-piston engine in which a pair of pistons is disposed in opposition in the bore of a cylinder for reciprocal sliding motion therein. Each cylinder has exhaust and intake ports. Each port is constituted of one or more arrays or sequences of openings disposed circumferentially in the cylinder wall near a respective end of the cylinder. The reciprocal movements of the pistons control the operations of the ports.

Opposed-piston engines possess a number of desirable features with respect to other two-stroke engines. Such advantages include low combustion chamber surface to volume ratio, superior scavenging, good engine balance in multiple cylinder designs, and superior power/weight ratios. These and other advantages have motivated development of vehicle designs that fit opposed-piston engines into heavy-duty trucks.

A truck is a vehicle equipped with an engine, which is designed for carrying and/or pulling loads. Medium- and heavy-duty trucks and work trucks (collectively, "heavy-duty trucks") are usually defined in terms of weight, capacity, and/or purpose. One useful definition, which is not intended to be limiting, is found in 49 U.S.C. 32901(a)(7) and (19). Typical heavy-duty truck constructions share some common structural characteristics. Presuming placement of an engine in the front of the vehicle ("front-end placement"), radiators and other heat exchangers are located at the front of the truck's engine compartment. A single solid front axle is used with a leaf spring suspension. Solid rear axles are used, often in tandem, to drive the vehicle. The power train is oriented along the vehicle's longitudinal axis, with the transmission mounted behind the engine and a drive shaft transmitting power to the rear axle(s). The major structural elements of a heavy-duty truck include twin frame rails that run from front to rear, just inside of the wheels.

The structure of a heavy-duty truck with front-end placement can include provision for mounting the engine directly over the front axle, between the frame rails. This is typical of L-4, L-5, L-6, V-6, and V-8 engine constructions. Trucks of this type are often available with different axle setbacks, but it is still frequently the case that the engine is mounted over the front axle. Two typical cab constructions are used for front-end placement in heavy-duty trucks. One is the cab-over arrangement, where the driver's cab is mounted above the engine. In another arrangement the cab is mounted behind the engine with a bonnet (hood) to cover the engine. However, it is the case that the elongated cylinder profiles of opposed-piston engines impose unusual engine shapes which are difficult to place in these kinds of heavy-duty truck structures; nevertheless, some attempts have been made.

Commer trucks were equipped with a front-end mounted Rootes-Lister TS two-stroke, opposed-piston diesel engine situated in a cab-over construction. The engine included a row of three cylinders disposed horizontally above the truck's drivetrain. Pistons were coupled by rocker arm linkages to a single crankshaft. The TS engine was originally designed for relatively low-power applications. As power requirements increased, larger cylinders were required. However, cylinder lengths were constrained by the spacing between the truck's side rails. Thus, the horizontal orientation of the cylinders inherently limited the power levels achievable by these engines when fitted into a standard heavy-duty truck chassis. Moreover, the rocker arm linkage arrangement necessitated by the single crankshaft architecture increased the amount of engine power lost to friction, thereby limiting the efficiency achievable by the TS engine.

The problems of orientation and construction that accompany the TS opposed-engine design have placed a limit on the benefits gained by use of opposed-piston engines in heavy-duty trucks.

It is therefore desirable to enable a vehicle such as a heavy-duty truck to be fitted with an efficient, large-displacement opposed-piston engine while retaining structural characteristics common to such vehicles.

SUMMARY

A solution to the friction problem of the rocker-style TS opposed-piston engine is to use a dual crankshaft opposed-piston configuration which eliminates rocker arm linkages. Further, disposing the row of cylinders vertically instead of horizontally permits elongation of the cylinders, which enables the engine to surpass the power achievable by the TS engine. The typical approach used to place conventional engines in cab-over heavy duty trucks is to locate the engine above a solid beam front axle; however, a vertically-disposed, dual crankshaft opposed-piston engine tends to be taller than conventional engines for heavy-duty trucks, and so this placement would be disadvantageous. The vertically-disposed opposed-piston engine could be placed over the axle, but the floor of the cab would have to be raised considerably to accommodate the engine's height, or the engine design would be compromised to make it longer in a longitudinal direction of the truck and shorter in a vertical direction.

To solve the problem of placement of a vertically-disposed, dual crankshaft opposed-piston engine in a heavy duty truck according to the principles set forth in this specification, the engine is placed in front of the front axle and the transmission is placed behind the front axle, thereby forming a gap between the engine and the transmission. The crankshafts are separated by the vertically-disposed cylinders and aligned with a longitudinal direction of the truck, which permits the power take-off point of the opposed-piston engine to be placed at an advantageous location with respect to the drivetrain of the truck. A coupling between the power take-off point and the transmission reaches across the gap, above the axle, which allows the axle to travel relative to the truck as is necessary for the suspension to absorb road irregularities.

Thus a solution to the problems of fitting a heavy-duty truck with a forward-mounted opposed-piston engine having a row of cylinders is to position the engine so as to dispose the cylinder profile in a vertical orientation, forward of the front axle of the truck, in space between the frame rails. Although the vertically-oriented cylinder profile presents a tall engine construction, placement forward of the front axle provides sufficient vertical clearance in the engine compartment to lower the engine with respect to the front axle and the interior of the cab. In some aspects, the engine configuration includes a row of cylinders and two crankshafts, one mounted at each end of the row.

A configuration for placement of an opposed-piston engine in a heavy-duty truck includes a chassis having two spaced-apart frame rails running in a longitudinal direction of the chassis, between front and rear ends, and a front wheel assembly with an axle attached to the frame rails. The opposed-piston engine is supported on the frame rails and positioned between the front end and the axle. In some aspects, the opposed-piston engine includes a cylinder assembly with a longitudinal axis disposed between the frame rails and oriented vertically with respect to the longitudinal direction. In other aspects, the opposed-piston engine includes a row of cylinders disposed between the rails and running in the longitudinal direction.

These engine placement configurations provide solutions to merging the advantages of a heavy-duty multi-cylinder opposed piston engine with a common type of heavy-duty truck structure utilized by many different manufacturers and sold in many different world markets.

DETAILED DESCRIPTION OF THE PREFERRED EMBODIMENTS

This description is directed to placement of an opposed-piston engine in a heavy-duty truck which includes a chassis having two spaced-apart frame rails running in a longitudinal direction of the truck, between front and rear ends, and a front wheel assembly with an axle attached to the frame rails. The opposed-piston engine is supported on the frame rails and positioned between the front end and the axle. In one embodiment, the opposed-piston engine includes a cylinder assembly with a longitudinal axis disposed between the frame rails and oriented vertically with respect to the longitudinal direction. In another embodiment, the opposed-piston engine includes a row of cylinders disposed in space between the frame rails and running in the longitudinal direction of the truck.

Figure 1:
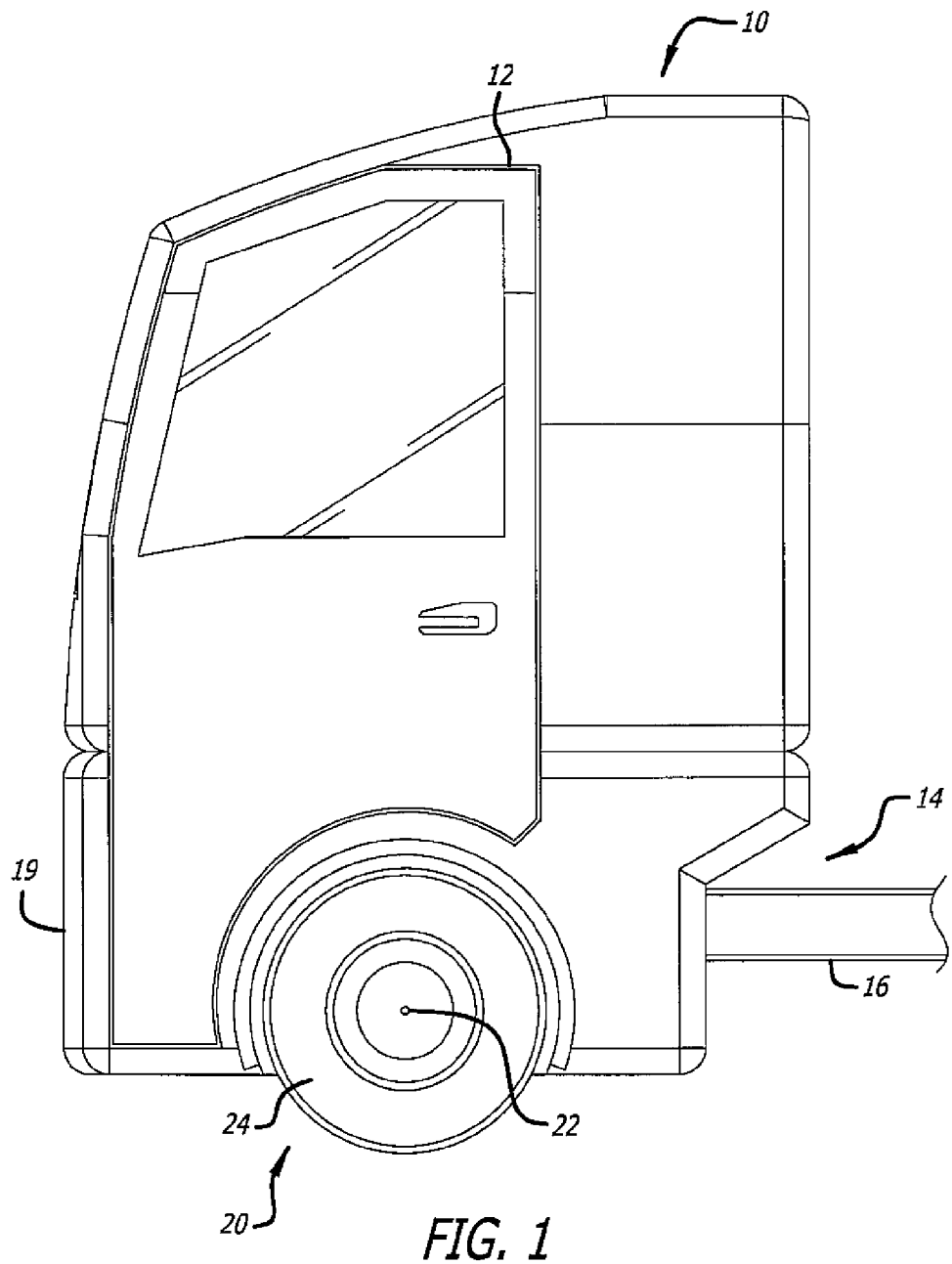
FIG. 1 is a side elevation view of the cab portion of a heavy-duty truck.
Figure 5:
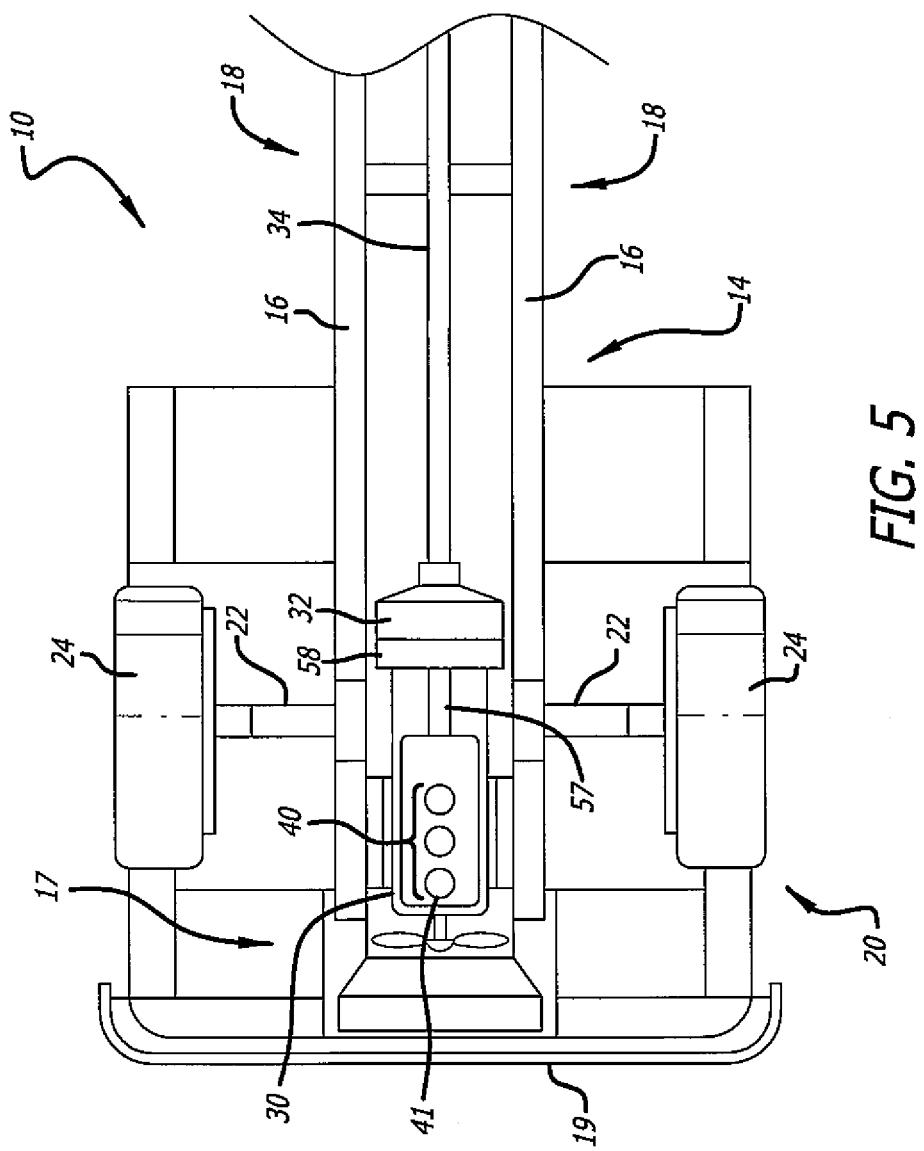
FIG. 5 is a partially schematic view, in plan, showing placement of an opposed-piston engine in a heavy-duty truck.

With reference to FIGS. 1 and 5, the forward (front) portion of a heavy-duty truck 10 includes a cab 12 with a chassis 14 having frame rails 16 which run in a longitudinal direction of the truck, between forward and rear portions 17 and 18 of the chassis. The forward portion 17 extends to the front end 19 of the truck. The cab 12 is situated over and above a front wheel assembly 20 with at least one axle 22 attached to the frame rails 16, in the forward portion 17 of the chassis. One or more wheels 24 are attached to each end of the axle 22.

Construction and assembly of the chassis 14 are conventional. The chassis may be of a ladder-frame type built from steel-composition elements having shapes and dimensions as required by any particular application. The dimensions of the frame may be as required for placement of an opposed-piston engine and associated drivetrain elements at least partially in the space between the frame rails 16. Mounting and attachment of a drivetrain and other elements of the truck to the frame rails 16 are preferably by conventional elements and materials.

Figure 2:
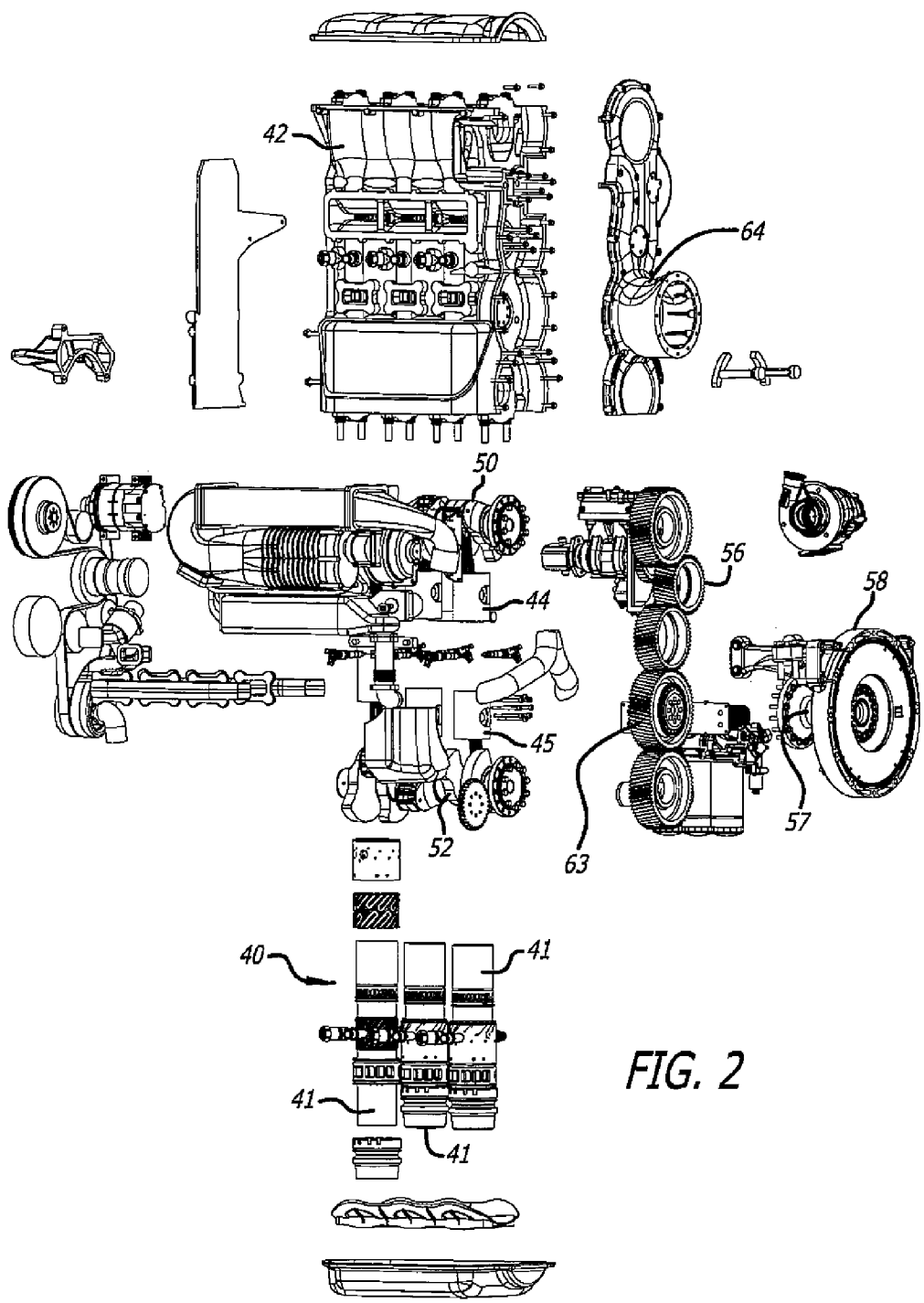
FIG. 2 is an exploded view of an opposed-piston engine to be placed in the forward portion of the cab portion of FIG. 1.

As per FIG. 5, the drivetrain (also called the "powertrain") of the truck 10 includes an opposed-piston engine 30, transmission assembly 32, and drive shaft 34. With reference to FIG. 2, the opposed-piston engine includes a cylinder assembly 40 constituted of a plurality of cylinders 41 mounted in an engine block 42. Two pistons 44 and 45 are disposed in opposition in the bore of each cylinder 41. The block retains the cylinders 41 in a row, which defines an inline (or, straight) engine configuration. An interlinked crankshaft system includes two rotatably-mounted crankshafts 50 and 52 disposed in a parallel spaced-apart configuration and a gear train assembly 56 linking the crankshafts and coupling them to the transmission assembly. Due to the vertical orientation of the engine 30, the crankshaft 50 is located above the crankshaft 52. The crankshaft 50 is positioned lengthwise along a first end of the row of cylinders 41 and is coupled to the pistons 44; the crankshaft 52 is disposed positioned lengthwise along a second end of the row of cylinders 41 and is coupled to the pistons 45. A powertrain drive member comprising a short shaft 57 is attached at one end to the gear train assembly 56 and at the other end to a transmission assembly member such as the flywheel 58 so as to couple a power take-off point of the engine directly to the transmission assembly.

Figure 3:
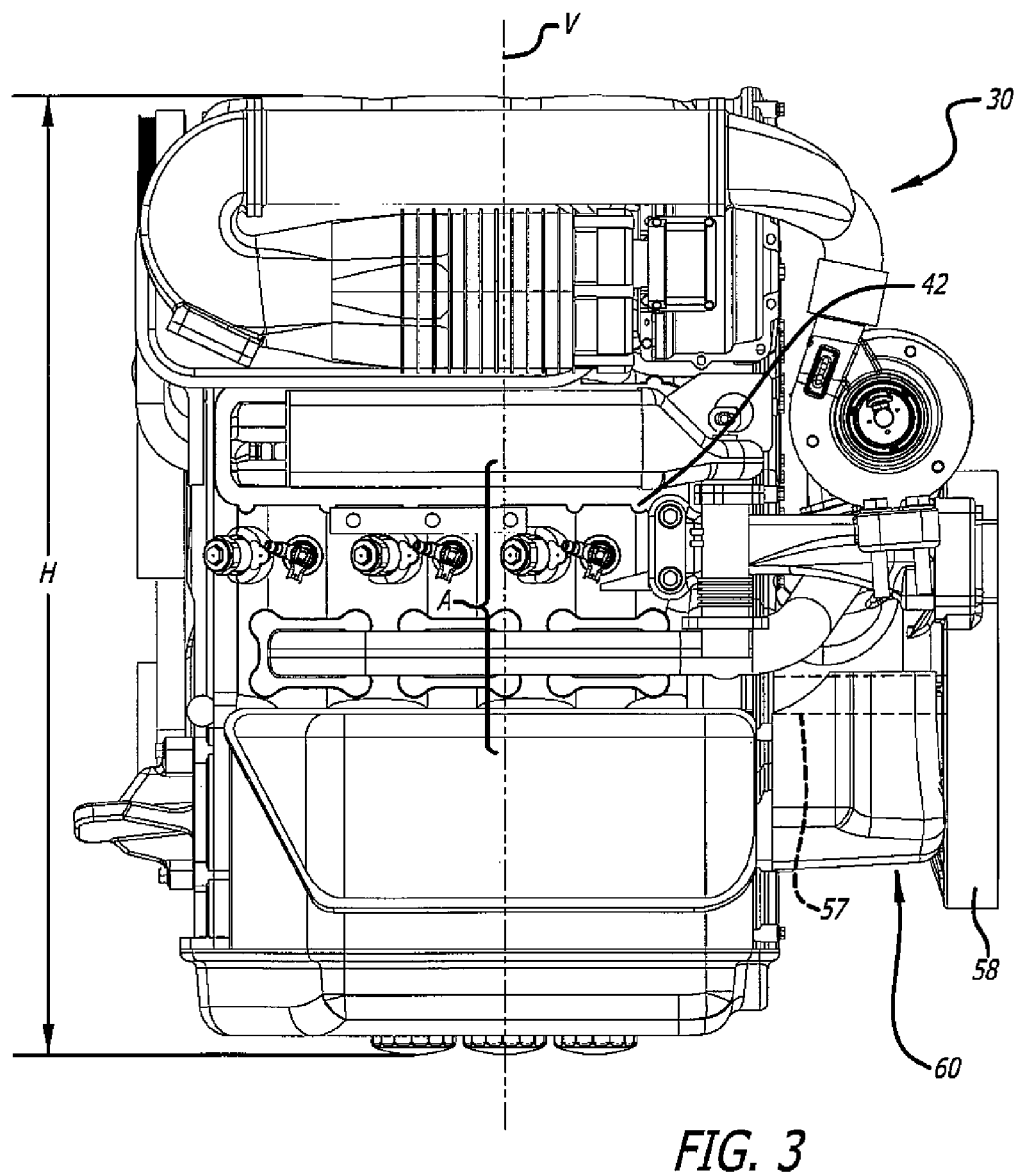
FIG. 3 is a side elevation view of the opposed-piston engine of FIG. 2 when assembled.

With reference to FIGS. 2-5, in some aspects, when the opposed-piston engine 30 is assembled (FIGS. 3, 4A, 4B), the engine has a vertical dimension V that is aligned with a longitudinal axis A of the cylinder assembly 40 (FIGS. 2, 3, 5). Preferably, the longitudinal axis A (FIG. 3) is in a plane containing the longitudinal axes of the cylinders 41 (FIGS. 2 and 5); for example, the longitudinal axis may be coincident with the longitudinal axis of one of the cylinders 41. In the example illustrated in FIGS. 3, 4A, and 4B, the height H of the engine 30 is taken along the vertical dimension.

The configuration of the opposed-piston engine is well-suited to placement as an efficient, large-displacement opposed-piston engine in a vehicle such as a heavy-duty truck in a manner that retains structural characteristics common to such vehicles. In this regard, the engine is placed such that the cylinder assembly is vertically oriented with respect to a longitudinal direction of the truck, and a longitudinal axis of the cylinder assembly runs through space between the frame rails. Viewed from another aspect, the opposed-piston engine includes cylinders arranged in a row that is disposed in space between the rails and runs in the longitudinal direction of the truck.

Figure 6:
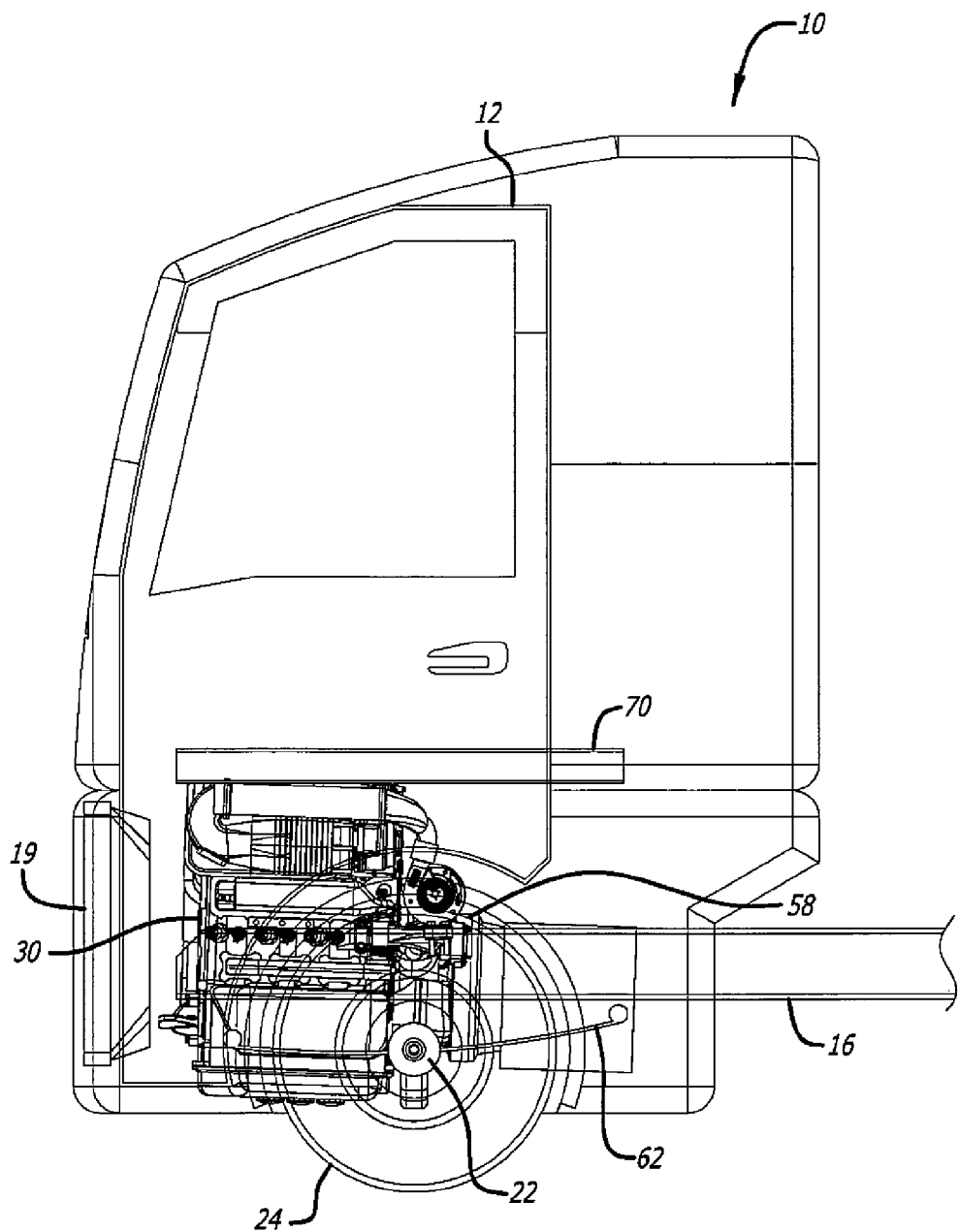
FIG. 6 is a shadow rendering of the heavy-duty truck of FIG. 1 with a power train installation therein according to the configuration of FIG. 5.
Figure 7:
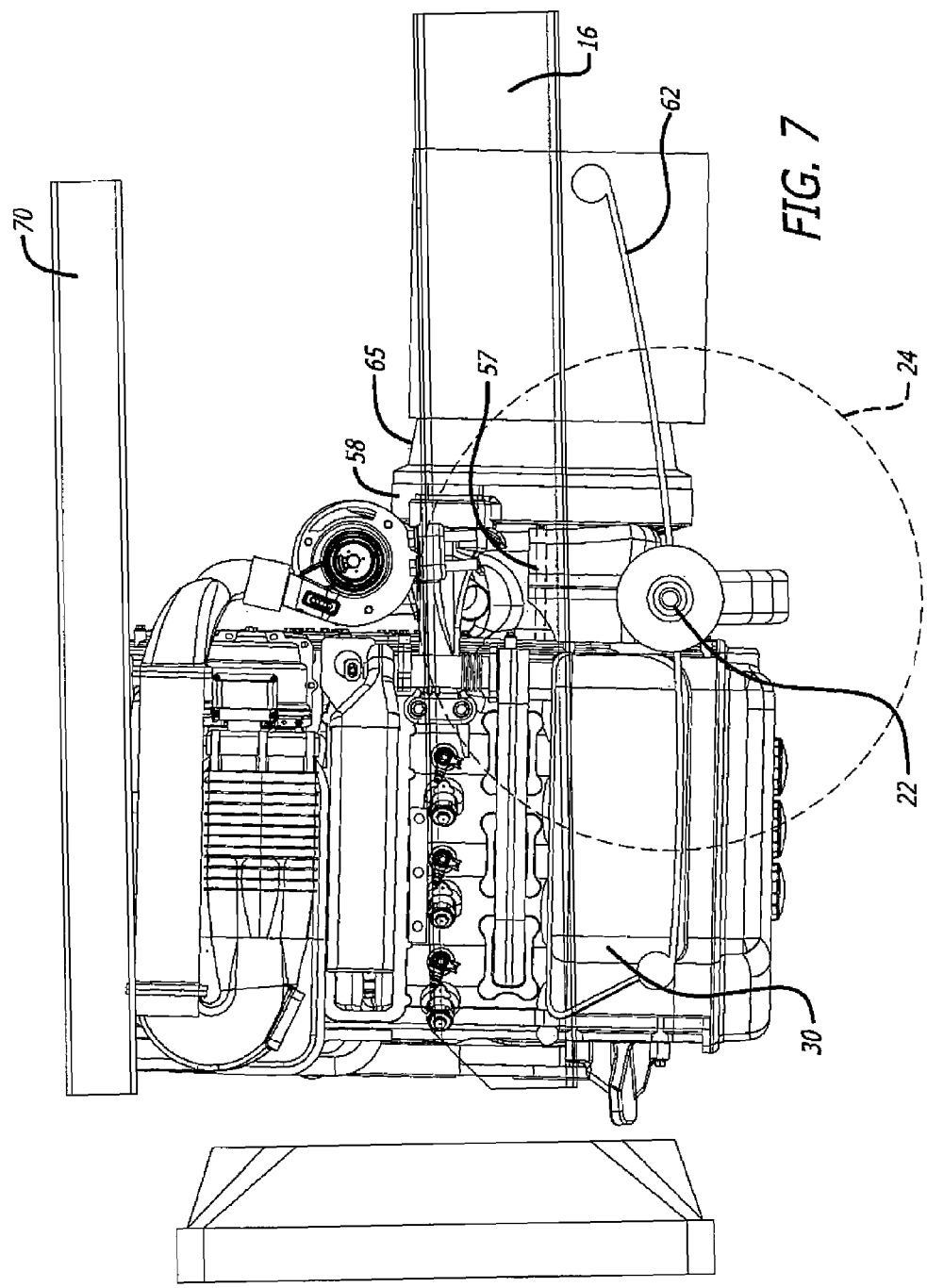
FIG. 7 is a side view that shows placement of an opposed-piston engine with respect to a frame rail, a front axle, and an engine tunnel assembly of a heavy-duty truck according to the configuration of FIG. 5.

As best seen in FIGS. 5, 6, and 7, the engine 30 is supported on the frame rails 16 at a position between the front end 19 and the axle 22. The engine 30 may be attached to support brackets (not seen) mounted on the frame rails 16, for example, by means of threaded fastening members 59 (best seen in FIGS. 4A and 4B) mounted to the sides of the engine 30. In the position shown in FIGS. 5, 6, and 7, the row of cylinders 41 is aligned with the longitudinal direction of the truck and extends through space defined between the frame rails 16. This placement disposes the cylinder assembly 40 in a vertical orientation with respect to the longitudinal direction of the truck and places the longitudinal axes of the cylinders in a plane that runs through space between the frame rails 16. The row of cylinders 41 is positioned within the chassis frame, in space between the frame rails 16, and in alignment with the longitudinal direction of the truck. A top portion of the engine 30 extends above the frame rails 16 and a bottom portion of the engine 30 extends below the frame rails 16.

As best seen in FIG. 3, when the engine 30 is assembled, there is a gap 60 between the engine 30 and the transmission assembly 58. The powertrain drive member (shaft 57) coupling the power take-off point of the engine to the flywheel 58 reaches across the gap. Per FIGS. 5, 6, and 7, the opposed-piston engine 30 is placed in front of the front axle 22, which permits it to be positioned lower in the truck 10 than is conventional. Additionally, the flywheel 58 is placed behind the front axle 22 facing the rear end of the truck, and positioned for being coupled to other elements of the transmission assembly 32. The gap 60 allows the axle 22 to travel relative to the truck 10 as is necessary for the suspension 62 to absorb road irregularities; the shaft 57 is positioned above the gap 60 and the axle 22.

With reference to FIG. 2, in some aspects it is desirable that the power take-off point of the engine 30 not be the lower crankshaft 52, but some other point in the gear train 56 above the crankshaft 52. In some aspects, the power take-off point may be the first gear 63 above the crankshaft 52 in the sequence of gears 56 connecting the upper and lower crankshafts 50 and 52. In these aspects, the shaft 57 is attached to rotate with this power take-off gear 63. One benefit of this placement is that the shaft 57 can be positioned high enough above the axle 22 so as not to impede the necessary axle travel, while still aligning with the transmission input shaft (not seen). A structural connection between the engine 30 and transmission assembly 32 is made in the gear cover 64 (best seen in FIG. 2) and bell housing 65 (best seen in FIG. 7), along with additional bracing as necessary so that the engine 30 and transmission assembly behave as a single structural unit. The resulting powertrain meets the demands of fitting in a typical cab-over style heavy-duty truck with minimal modifications to the truck design, while at the same time not compromising the design of the high efficiency opposed-piston engine.

Figure 8:
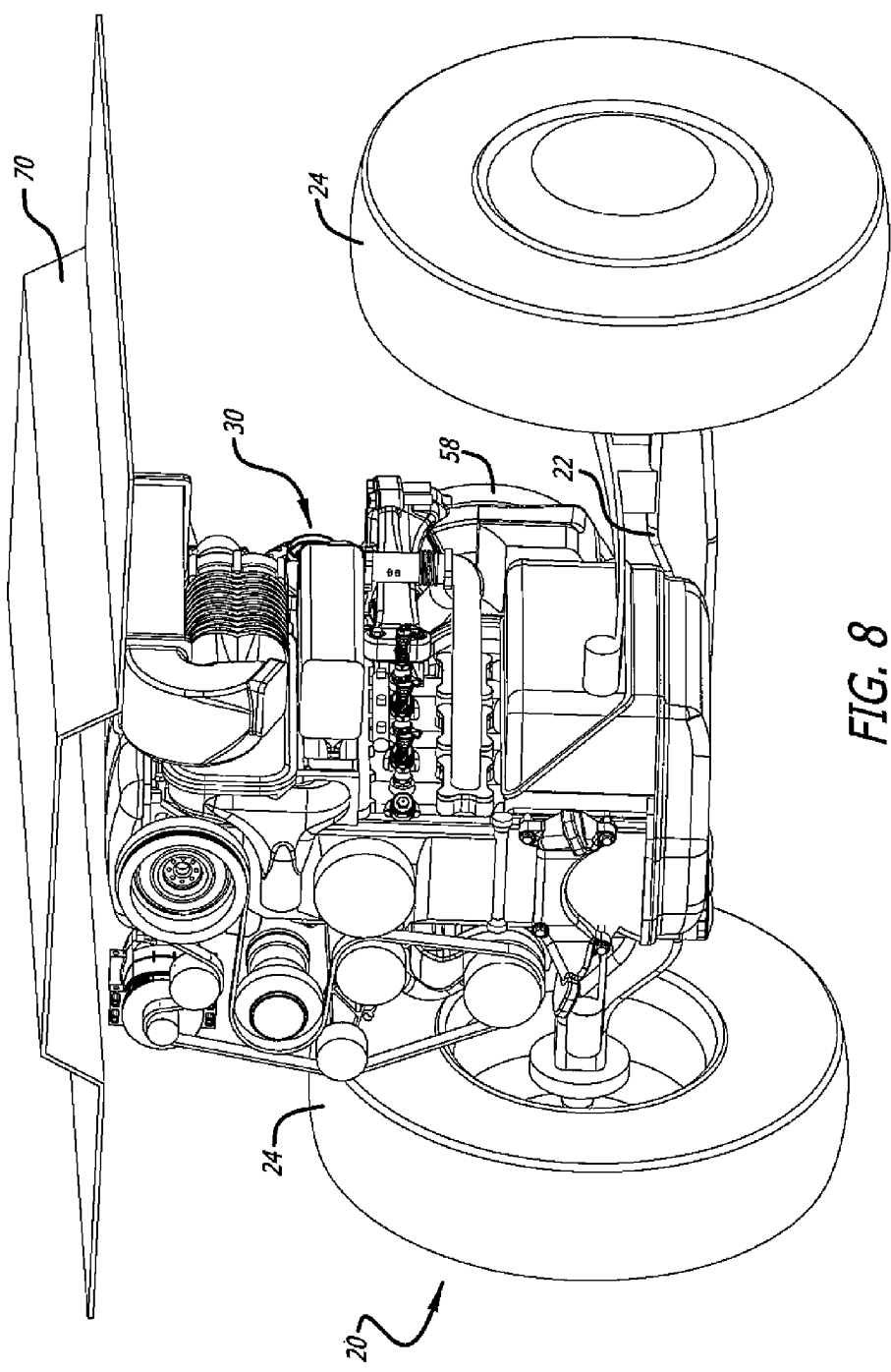
FIG. 8 shows placement of an opposed-piston engine with respect to a frame rail, a front axle and a floor tunnel assembly of a heavy-duty truck according to the configuration of FIG. 5.

As shown in FIGS. 6, 7, and 8, the cab 12 is attached to the frame rails above or over a floor tunnel assembly 70 that defines the bottom (floor) of the interior of the cab 12. The placement of the engine 30 disposes the engine beneath the floor tunnel assembly 70.

Figure 4A:
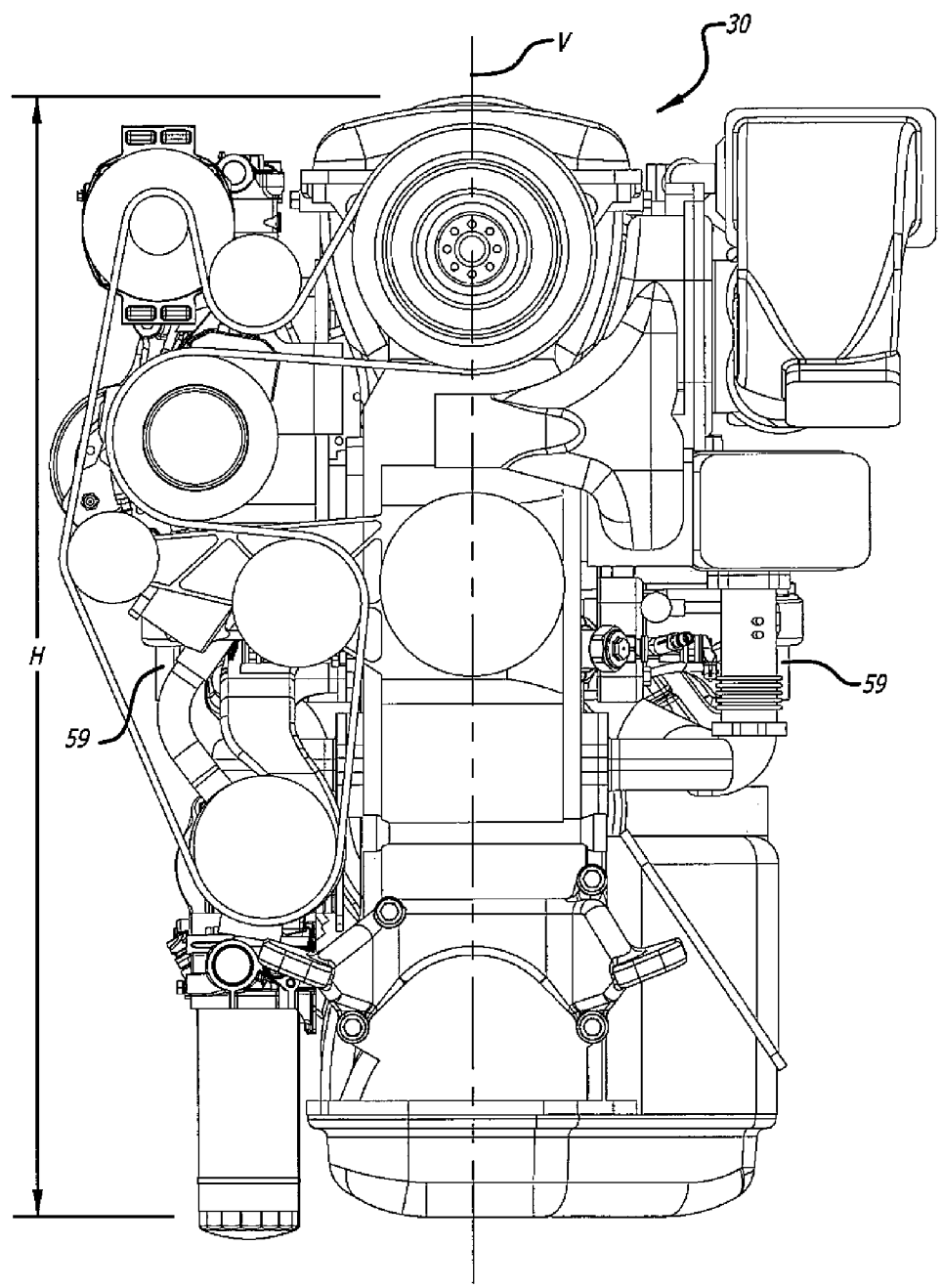
FIGS. 4A and 4B are front and rear elevation views, respectively, of the assembled opposed-piston engine of FIG. 3.
Figure 4B:
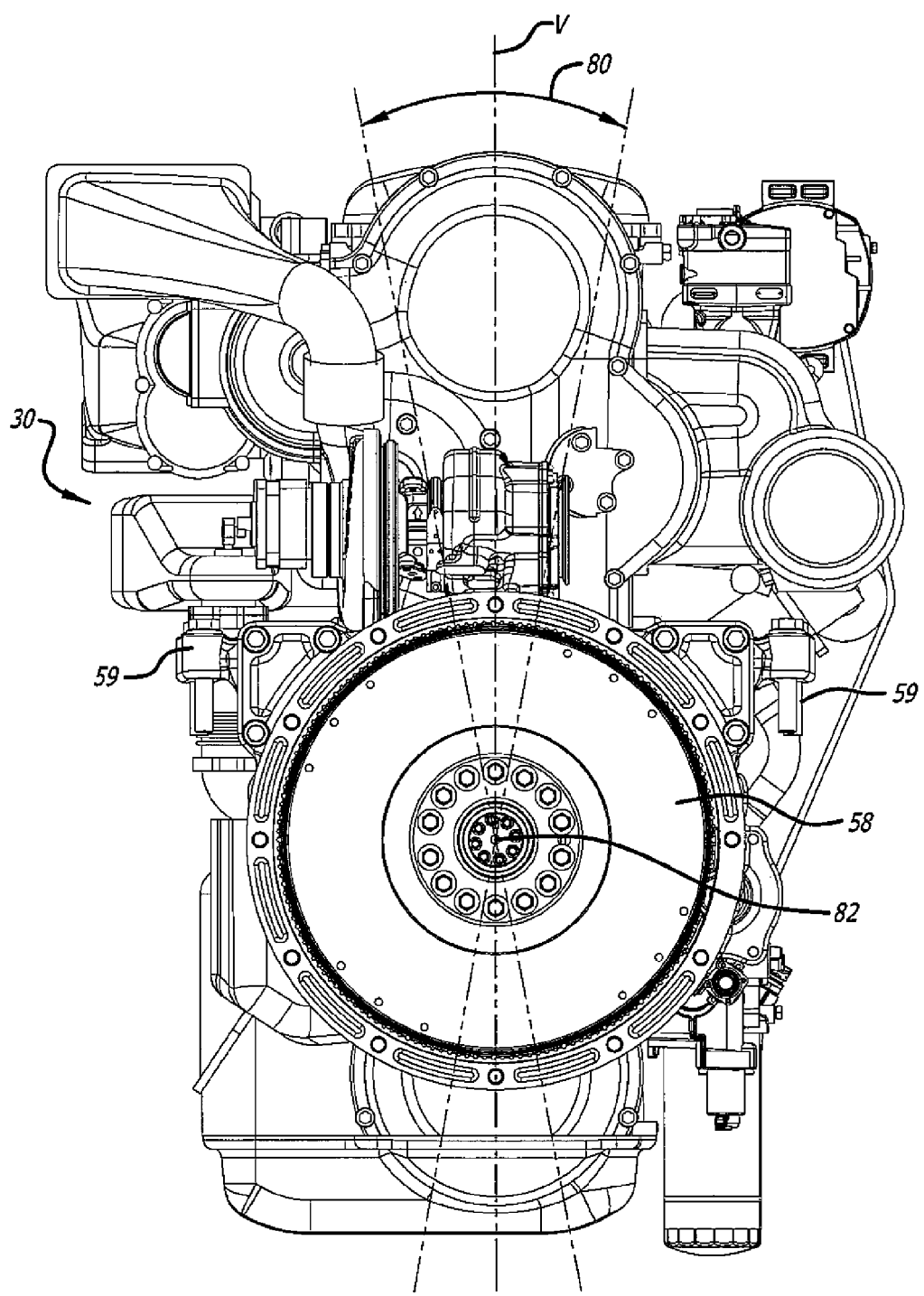

With reference to FIG. 4B, in other aspects, when placed in the truck according to the embodiments described hereinabove, it may be desirable to dispose the engine 30 in an orientation rotated in a CW or CCW direction 80 from the vertical V, for example on an axis 82 running through the flywheel 58. In these cases, the orientation of the engine 30 is still considered to be within the scope of a "vertical" orientation.

Although principles of engine placement have been described with reference to presently preferred embodiments, it should be understood that various modifications can be made without departing from the spirit of the described principles. Accordingly, any patent protection accorded to these principles is limited only by the following claims.

The invention claimed is:

1. A truck, comprising:
   a chassis with spaced-apart frame rails running in a longitudinal direction of the chassis, between front and rear ends;
   a front wheel assembly with an axle attached to the frame rails; and,
   an opposed-piston engine supported on the frame rails and positioned between the front end and the axle;
   the opposed-piston engine including an inline cylinder assembly with a longitudinal axis running through space between the rails; and
   the cylinder assembly being oriented vertically with respect to the longitudinal direction;
   in which the opposed-piston engine includes two crankshafts positioned at respective exhaust ends and intake ends of the cylinders, a gear assembly coupling the two crankshafts, and a powertrain drive member coupled to the gear assembly.

2. The truck of claim 1, in which the powertrain drive member is positioned above the axle.

3. The truck of claim 2, further including a flywheel positioned between the axle and the rear end, in which the powertrain drive member is also coupled to the flywheel.

4. The truck of claim 1, in which the opposed-piston engine is supported in a cab-over location.

5. The truck of claim 4, in which the opposed-piston engine is supported beneath a floor tunnel assembly.

6. The truck of claim 5, in which the powertrain drive member is positioned above the axle.

7. The truck of claim 6, further including a flywheel positioned between the axle and the rear end, in which the powertrain drive member is also coupled to the flywheel.

8. The truck of claim 5, further including a cab attached to the frame rails above the floor tunnel assembly.

9. A truck, comprising:
   a chassis with two spaced-apart frame rails running in a longitudinal direction of the chassis, between front and rear ends;
   a front wheel assembly with an axle attached to the frame rails; and,
   an opposed-piston engine supported on the frame rails and positioned between the front end and the axle;
   the opposed-piston engine having an inline configuration including a row of cylinders disposed in space between the rails and running in the longitudinal direction; and
   in which the opposed-piston engine includes two crankshafts positioned at respective exhaust ends and intake ends of the cylinders, a gear assembly coupling the two crankshafts, and a powertrain drive member coupled to the gear assembly.

10. The truck of claim 9, in which the powertrain drive member is positioned above the axle.

11. The truck of claim 10, further including a flywheel positioned between the axle and the rear end, in which the powertrain drive member is also coupled to the flywheel.

12. The truck of claim 9, in which the opposed-piston engine is supported in a cab-over location.

13. The truck of claim 12, in which the opposed-piston engine is supported beneath a floor tunnel assembly.

14. The truck of claim 9, in which the powertrain drive member is positioned above the axle.

15. The truck of claim 14, further including a flywheel positioned between the axle and the rear end, in which the powertrain drive member is also coupled to the flywheel.

16. The truck of claim 9, further including a cab attached to the frame rails above the floor tunnel assembly.

17. The truck of claim 1, in which power for the drive train is provided from a power take-off gear in the gear assembly.

18. The truck of claim 17, in which a first crankshaft of the two crankshafts is positioned above a second crankshaft of the two crankshafts and the power take-off gear is a gear above the second crankshaft in the gear assembly.

19. The truck of claim 9, in which power for the drive train is provided from a power take-off gear in the gear assembly.

20. The truck of claim 19, in which a first crankshaft of the two crankshafts is positioned above a second crankshaft of the two crankshafts and the power take-off gear is a gear above the second crankshaft in the gear assembly.

\* \* \* \* \*

UNITED STATES PATENT AND TRADEMARK OFFICE
CERTIFICATE OF CORRECTION

| | | |
|---|---|---|
| PATENT NO. | : 9,849,770 B2 | Page 1 of 1 |
| APPLICATION NO. | : 13/891466 | |
| DATED | : December 26, 2017 | |
| INVENTOR(S) | : Fuqua | |

It is certified that error appears in the above-identified patent and that said Letters Patent is hereby corrected as shown below:

Column 6, Line 66, cancel the text beginning with "14. The truck of claim 9," to and ending "the gear assembly." in Column 7, Line 19, and insert the following claims:

--14. The truck of claim 9, further including a cab attached to the frame rails above the floor tunnel assembly.
15. The truck of claim 1, in which power for the drive train is provided from a power take-off gear in the gear assembly.
16. The truck of claim 15, in which a first crankshaft of the two crankshafts is positioned above a second crankshaft of the two crankshafts and the power take-off gear is a gear above the second crankshaft in the gear assembly.
17. The truck of claim 9, in which power for the drive train is provided from a power take-off gear in the gear assembly.
18. The truck of claim 17, in which a first crankshaft of the two crankshafts is positioned above a second crankshaft of the two crankshafts and the power take-off gear is a gear above the second crankshaft in the gear assembly.--

Signed and Sealed this
Fifth Day of June, 2018

Andrei Iancu
*Director of the United States Patent and Trademark Office*